(12) United States Patent
Guillemin et al.

(10) Patent No.: US 11,520,053 B2
(45) Date of Patent: Dec. 6, 2022

(54) METHOD FOR ACQUIRING AND MODELLING WITH A LIDAR SENSOR AN INCIDENT WIND FIELD

(71) Applicant: IFP Energies nouvelles, Rueil-Malmaison (FR)

(72) Inventors: Fabrice Guillemin, Rueil-Malmaison (FR); Hoai-Nam Nguyen, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 493 days.

(21) Appl. No.: 16/695,873

(22) Filed: Nov. 26, 2019

(65) Prior Publication Data

US 2020/0166650 A1 May 28, 2020

(30) Foreign Application Priority Data

Nov. 26, 2018 (FR) .................................... 18/71.844

(51) Int. Cl.
| | |
|---|---|
| *G01S 17/95* | (2006.01) |
| *F03D 17/00* | (2016.01) |
| *G01S 7/48* | (2006.01) |
| *G01S 17/58* | (2006.01) |
| *G06F 17/16* | (2006.01) |
| *G06F 17/17* | (2006.01) |
| *G01P 5/26* | (2006.01) |

(52) U.S. Cl.
CPC .............. *G01S 17/95* (2013.01); *F03D 17/00* (2016.05); *G01P 5/26* (2013.01); *G01S 7/4808* (2013.01); *G01S 17/58* (2013.01); *G06F 17/16* (2013.01); *G06F 17/17* (2013.01); *F05B 2270/8042* (2013.01)

(58) Field of Classification Search
CPC ........ G01S 17/95; G01S 17/58; G01S 7/4808; F03D 17/00; F05B 2270/8042; G01P 5/26; G06F 17/16; G06F 17/17
See application file for complete search history.

(56) References Cited

U.S. PATENT DOCUMENTS

| | | | |
|---|---|---|---|
| 9,784,887 B1* | 10/2017 | Ulmer | ...................... B64D 1/08 |
| 11,106,790 B2* | 8/2021 | Wojnowicz | ............ G06F 21/554 |
| 2013/0184838 A1* | 7/2013 | Tchoryk, Jr. | ............ G01S 17/58 |
| | | | 700/31 |
| 2015/0304634 A1 | 10/2015 | Karvounis | |

OTHER PUBLICATIONS

Preliminary Search Report for FR 18/71.844, dated Jul. 31, 2019.
(Continued)

*Primary Examiner* — Elias Desta
(74) *Attorney, Agent, or Firm* — Fitch, Even, Tabin & Flannery LLP (57) ABSTRACT

The invention is a method for detecting aberrant values of an incident wind field in a space located upstream of a lidar sensor. The method comprises acquiring and modelling a measurement rws(k) with the lidar sensor of an incident wind field, by estimating a median mr(k) and a mean absolute deviation dr(k) in real time of measurements of the incident wind field and detecting aberrant values in real time using the estimated median mr(k) and the mean absolute deviation dr(k).

16 Claims, 5 Drawing Sheets

(56) References Cited

OTHER PUBLICATIONS

Adcock Christiane et al: "Data-Driven Wind Farm Optimization Incorporating Effects of Turbulence Intensity", 2018 Annual American Control Conference (ACC). AACC, (Jun. 27, 2018), pp. 695-700.

Christophe Leys et al: "Detecting outliers: Do not use standard deviation around the mean, use absolute deviation around the median", Journal of Experimental Social Psychology, vol. 49, No. 4, (Jul. 1, 2013), pp. 764-766.

Baltenswei Ler Andri et al: "Terrestrial laser scanning improves digital elevation models and topsoil pH modelling in regions with complex topography and dense vegetation", Environmental Modelling & Software, Elsevier, Amsterdam, NL, vol. 95, (Jun. 5, 2017), pp. 13-21.

F. Guillemin et al: "Nacelle LiDAR online wind field reconstruction applied to feedforward pitch control", Journal of Physics: Conference Series, vol. 753, (Sep. 1, 2016), p. 052019.

* cited by examiner

METHOD FOR ACQUIRING AND MODELLING WITH A LIDAR SENSOR AN INCIDENT WIND FIELD

CROSS REFERENCE TO RELATED APPLICATIONS

Reference is made French Application No. 18/71.844 filed Nov. 26, 2018, which is incorporated herein by reference in its entirety.

BACKGROUND OF THE INVENTION

Field of the Invention

The present invention relates to the field of lidar (light detection and ranging) sensors used as remote-sensing means for measuring wind speed. It also relates to the field of wind turbines equipped with lidar sensors, and to the control of such wind turbines.

Description of the Prior Art

The detection of aberrant values is ubiquitous in many data-processing tasks, covering a wide range of fields such as signal processing, industrial control, etc. A good definition of an aberrant value is a measurement that differs so greatly from the other measurements that there is suspicion that it is caused by a different mechanism.

In the field of wind power, over the last few years, the detection and observation of light using lidar has been recognized as a reliable and feasible remote-sensing technology for measuring and predicting wind speed.

Specifically, recent progress in lidar technology has facilitated the deployment of lidar for real-time control applications. Lidar delivers measurements that characterize the upstream wind flux with high spatial and temporal resolutions. Patent application FR 3013777 corresponding to US published application 2015/145253 describes such an application. With lidar, measurements that differ substantially from the normal range of the detected data are considered to be aberrant values. These aberrant values may be caused by sensor errors or data-transmission errors.

Measurement-dependent wind predictions depend greatly on the quality of the lidar measurements. As the measurement data of the lidar inevitably contains aberrant data, including erroneous data generated for reasons such as apparatus malfunctions or valid data representing extraordinary situations such as unfavorable meteorological conditions, the predictions are impacted and often not optimal.

In addition, the reconstruction of the wind field comprises estimating the wind speed and the confidence interval, and, in general, both rely on the quality of the lidar measurement.

Therefore, the detection of aberrant values gives beneficial insight required to make the application of lidar data workable.

Motivated by the desire to collect more useful information from lidar data, the invention mitigates the aforementioned drawbacks and provides a method allowing aberrant values to be removed in real time. The approach has been validated for lidar systems mounted on nacelles, with real measurement data.

SUMMARY OF THE INVENTION

A first aspect of the invention relates to a method for detecting aberrant values of an incident wind field in a space located upstream of a lidar sensor. The method comprises:

a) acquiring and modelling measurement rws(k) with the lidar sensor of an incident wind field;
b) estimating a median $mr_{(k)}$ and the mean absolute deviation dr(k) in real time of the measurements of the incident wind field; and
c) detecting aberrant values in real time using the estimated median mr(k) and the mean absolute deviation dr(k), the detecting step being carried out with a formula: $|rws(k)-m_r(k)| \leq \sigma d_r(k)$ where $\sigma$ is a positive scalar.

According to one aspect of the invention, the mean absolute deviation dr(k) in real time of the incident wind field is given by a formula:

$$d_r = \frac{1}{n}\sum_{i=1}^{n} |x_i - m(X)|$$

According to one implementation of the invention, the method comprises a step of reconstructing the measurement of the lidar sensor, by removing the detected aberrant values from the modelled measurement rws(k).

Thus, a clean measurement signal without aberrant values is obtained.

According to one aspect of the invention, the method for acquiring and modelling with a lidar sensor an incident wind field in a space located upstream of the lidar sensor comprises the following steps:

a) generating a mesh of the space located upstream of the lidar sensor, in which the mesh of the space is generated using a set of discrete points positioned in a predefined three-dimensional grid comprising a set of cells composed of estimation points and of measurement points.

The mesh-generation step allows the space upstream of the lidar sensor to be discretized (or sampled) to form a three-dimensional grid composed of discrete points, and it is possible for these various discrete points to be made to coincide either with measurement points or with estimation points required by the modelling method. It furthermore allows the measurement and estimation points to be positioned relative to one another and the distances separating all of these discrete points to be known.

b) measuring the amplitude and direction of the wind at the various measurement points located in the upstream space and positioned at least two different distances from the lidar sensor, along at least three measurement axes, The measurements carried out in this step provide sufficient reliable initial data to use an algorithm for estimating the amplitude and the direction of the wind at the estimation points.

c) estimating the amplitude and the direction of the wind at any time at all of the estimation points, the estimation being carried out by optimization, using a weighted recursive least-squares method, of a cost function J that uses at least the data of the measured points, spatial wind-speed coherence data, temporal wind-speed coherence data, and data qualifying the quality of the measurements carried out at the measurement points.

Accounting for these various parameters in a cost function to be optimized provides an estimation of the amplitude and of the direction of the wind at each estimation point of the mesh to be achieved.

d) reconstructing, in real time and in a defined coordinate system, the incident wind field in three dimensions (3D) from the wind amplitudes and directions estimated and measured for each point.

This step allows, in 3D, in the volume sampled by the three-dimensional grid, the reconstruction of incident wind field. In this step, a history of the lidar measurements is generated, which allows the past states of the wind field to be known. This history is incorporated into the synthesis of the current and future estimations of the 3D wind field, which allows reconstruction in real time.

The advantage of using an optimization approach, using a recursive form of the weighted least squares technique, makes possible determination of a complete image in three dimensions (3D) of the incident wind propagating through the space located upstream of the lidar sensor.

According to one aspect of the invention, the measurement m of the amplitude and of the direction of the wind at a measurement point is given by a relationship of the form:

$$m_{j,x}(k) = a_j v_{j,x}(k) + b_j v_{j,y}(k) + c_j v_{j,z}(k)$$

where $v_{j,x}(k)$, $v_{j,y}(k)$, $v_{j,z}(k)$ are wind-speed values projected into a coordinate system x, y, z at an initial time (k), and $a_j$, $b_j$, $c_j$ with j=0, 1, 2, 3, 4 are measurement coefficients, which are given by $$\begin{cases} a_j = \cos(\theta_j), \\ b_j = \sin(\theta_j)\cos(\varphi_j), \\ c_j = \sin(\theta_j)\sin(\varphi_j) \end{cases}$$

where θj, φj are, respectively, the zenith and the azimuth of the measurement axis in a spherical coordinate system.

In this way the wind vector, at each sampled time, for all of the points of the space, is composed of three components that will allow the complete image to be determined in three dimensions. Furthermore, these measurement coefficients are dependent only on the angles of the beam and are not dependent on the measurement distances which facilitates the computational programming of the cost function J.

According to one aspect of the invention, the cost function J at any time (t) is written in the following form:

$$J(t) = (\omega(0) - \hat{\omega}(0))^T P_0^{-1}(\omega(0) - \hat{\omega}(0)) + \sum_{j=1}^{t}(\omega(j) - \omega(j-1))^T Q^{-1}(\omega(j) - \omega(j-1)) + \sum_{j=1}^{t}\omega(j)^T C_s^T R_s^{-1} C_s \omega(j) + \sum_{j=1}^{t}(C_m \omega(j) - m_m)^T R_m^{-1}(C_m \omega(j) - m_m(j))$$

where ω is an ordered vector composed of all the components of the speed at the points of the space at which the wind is estimated, $\hat{\omega}(0)$ is the estimation of the wind speed at the time 0, $P_0$, Q, $R_s$ and $R_m$ are weighting matrices of suitable size, and $C_s$, $C_m$ are matrices that take into account the wind speed and the measurement noise.

Using such a cost function, it is possible to estimate the wind speed at an estimation point. Furthermore, such a function makes it possible to achieve a clear interpretation of the weighting matrices $P_0$, Q, $R_s$ and $R_m$.

According to one aspect of the invention, the measurements of the amplitude and direction of the wind at the various measurement points are carried out at a sampling rate of at least 0.25 Hz. The use of such a sampling frequency range results in a plurality of measurements being obtained simultaneously on a given measurement axis with these measurements nonetheless being reliable and precise.

According to one aspect of the invention, the measurements of the amplitude and direction of the wind at the various measurement points are carried out at—least two different distances along the measurement axis. Taking measurements at—least two distances allows a three-dimensional volume to be defined that is sufficient to encompass the blades of a wind turbine, as will be described below.

According to one aspect of the invention, the measurements of the amplitude and direction of the wind are taken along at least three measurement axes. Employing at least three measurement axes makes possible generation of a fine mesh of the upstream space which provides a quantity of measurements sufficient for perform the step of estimating the wind speed to be obtained.

According to one aspect of the invention, the spatial coherence of the wind speed along the x, y and z axes of a Cartesian coordinate system is estimated using a formula:

$$C_s \omega \approx 0$$

$$C_s = \begin{bmatrix} C_l \\ C_t \\ C_v \end{bmatrix}$$

with
:

$C_l$ characterizing the variation in the wind speed for an estimation domain along the longitudinal axis x;
$C_t$ characterizing the variation in the wind speed for an estimation domain along the lateral axis y and
$C_v$ characterizing the variation in the wind speed for an estimation domain along the vertical axis z.

The effect of such a characterization makes possible coding such a function computationally.

According to one aspect of the invention, the spatial coherence of the wind speed along the x, y and z axes of the Cartesian coordinate system is estimated under the following assumptions:

The variation in the wind speed along the longitudinal axis x is small and the partial derivative $dv_x/dx$ is relatively small along the longitudinal axis, the wind changes without discontinuity along the lateral axis y and the partial derivative $dv_x/dy$ is small along the lateral axis y, the wind changes along the vertical axis z according to a power law, which is given by the formula:

$$v_l = v_{lr}\left(\frac{z}{z_r}\right)^\alpha$$

where α is an exponent of the power law, $v_l$ is the longitudinal wind at an altitude z above the ground, and $z_r$ a reference altitude.

Such assumptions are realistic and allow wind-speed estimations that are reliable and precise to be obtained.

According to one aspect of the invention, the quality of the measurements carried out by the lidar is represented using a model of the form:

$$C_m \omega = m_m + \epsilon_m$$

where $\epsilon_m$ describes the measurement noise.

This type of model allows inaccuracies in the lidar measurements to be taken into account.

According to one aspect of the invention, the estimation of the amplitudes and of the directions of the wind field at a time (t) at all of the estimation points is given by the following formula:

$$\omega(t)=\omega(t-1)+K(y(t)-C\omega(t-1))$$

The advantage of the above formula is that it links the wind-speed estimations over time for the estimation points.

The invention also relates to a computer-program product that comprises code instructions which implement the steps of the method for detecting aberrant values described above. The program is executed by a processing unit of the lidar.

The invention also relates to a lidar sensor that comprises in memory the code instructions of a computer-program product such as described above and which is arranged to execute such a computer-program product.

In this way, a lidar sensor executing such a computer-program product returns reliable information on an incident wind field in three dimensions and in real time.

One subject of the invention also relates to a wind turbine that comprises a lidar sensor such as described above.

According to one aspect of the invention, the lidar sensor is placed on the nacelle of the wind turbine.

Lastly, the invention also relates to a method at least one of controlling and monitoring a wind turbine equipped with a lidar sensor and a programmable logic controller. The method comprising following steps:
a) generating an anticipatory control strategy for controlling the wind turbine and exploiting the detection of aberrant values achieved via the reconstruction of the incident wind field in three dimensions and in real time,
b) controlling, by using the generated control strategy, by controlling an angle of the blades or orientation of the nacelle.

Having a sufficiently robust and precise information regarding the state of the incident wind approaching the rotor allows a new approach of control including integrating a dynamic and preventive pre-positioning term. Furthermore, the ability to reconstruct, on-line, in real time, an incident wind field approaching the rotor plane opens up many potential applications such as quantification of the misalignment of the wind turbine, a power curve, a transfer function of the nacelle, detection of gusts, monitoring and diagnosis of load and the risk of fatigue, optimization of preventive maintenance, analysis of the resource and optimization of production. This allows the efficiency of a wind turbine to be increased, the cost of maintenance to be decreased, the lifetime of components to be increased and investment costs to be decreased by design optimization.

BRIEF DESCRIPTION OF THE DRAWINGS

Other features and advantages of the method according to the invention will become apparent on reading the description below of one nonlimiting example embodiment, with reference to the appended Figs., which are described below.

DETAILED DESCRIPTION OF THE INVENTION

Notations

Figure 1:
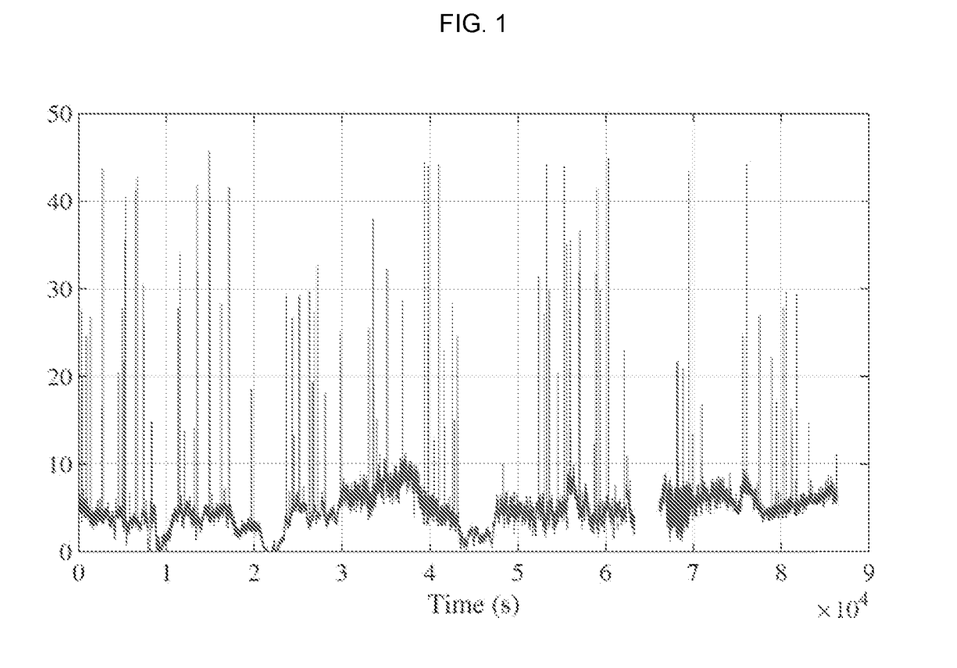
FIG. 1 illustrates lidar measurements for one beam and for one day.
Figure 2:
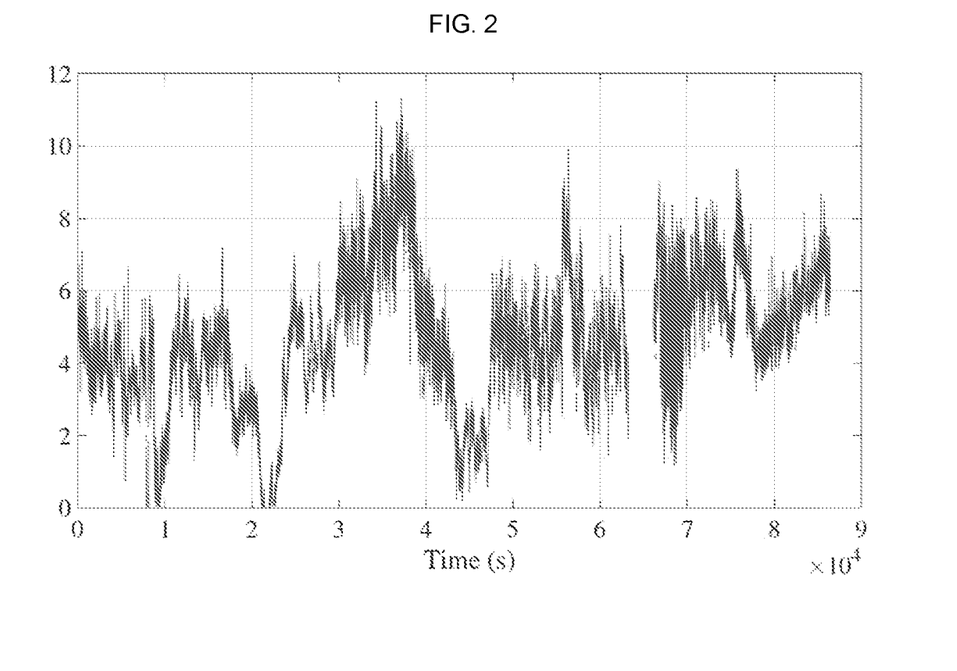
FIG. 2 illustrates lidar measurements after aberrant values have been removed for one beam and for one day.

In the description, the following notations are used:
x, y, z are directions of the three-dimensional coordinate system, with z the vertical axis and x the principal direction of the wind.
$\Theta$ and $\varphi$ are angles of orientation of the lidar sensor. These angles are shown in FIG. 1 with the angle $\theta$ being the angle made by the projection of the measurement axis of the lidar in the plane (y, z), and $\varphi$ is the angle made by the projection of the measurement axis of the lidar in a plane formed by the axis x and the projection of the measurement axis of the lidar in the plane (y, z).
m(t) is measurement of the lidar sensor at a measurement point.
$V_{j,x}(k)$, $v_{j,y}(k)$, $v_{j,z}(k)$ are projections of the wind speed on x, y, z.
$\omega$ is the ordered vector composed of all the components of the wind speed at the points of the space at which the wind is estimated on the axes x, y and z of the three-dimensional coordinate system.
$\hat{\omega}(t)$ is the estimation of $\omega(t)$ at the time t.
P(t) is the auxiliary matrix array that is variable over time, and which may be obtained at the time t.
$P_0$, Q, $R_s$ and $R_m$ are weighting matrices of suitable size.
$\Sigma$ is a positive scalar.
Rp is a vector.
mr(k) is a median.

In the rest of the description, the term "lidar" is used to designate a lidar sensor.

A method for detecting aberrant values in real time is provided, which is based on an on-line estimation of the median and the mean absolute deviation. The method has been validated using real lidar-measurement data, showing that aberrant values may be detected and must be removed from the lidar measurements.

Figure 3:
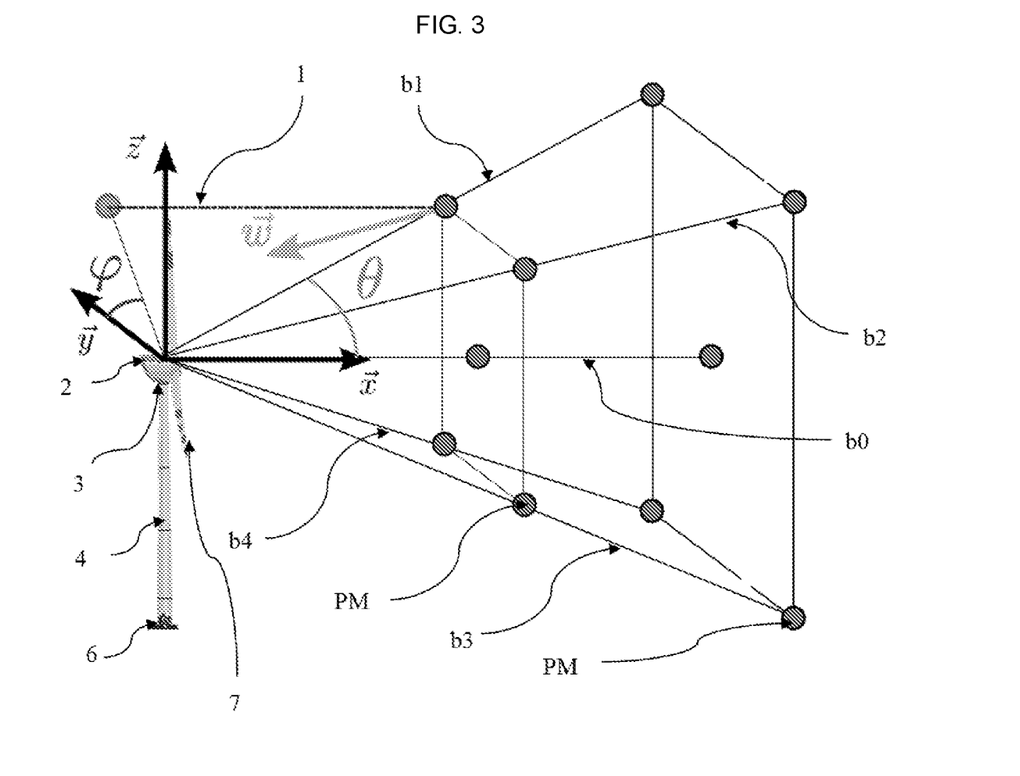
FIG. 3 illustrates a wind turbine equipped with a lidar sensor according to the invention.

A 5-beam pulsed nacelle lidar as shown in FIG. 3 measures the component of the wind speed that corresponds to the wind speed projected in the direction of the laser beam, namely the beam b0, then the beam b1, the beam b2, the beam b3, and lastly beam b4. An advantageous feature of the lidar is that it is able to measure the projection of the wind speed at a plurality of distances along each beam, for example at distances from 50 to 200 m, at a sampling rate of 4 Hz. At each sampling time, only the measurements of one beam may be obtained.

As shown in FIG. 1, which shows the lidar measurements for one beam and for one day in the case where the detecting method was not used, it may be seen that the lidar does not deliver measurements all the time (specifically, this effect may be observed during the time interval between ($6\times10^4$: $7\times10^4$), and that, at most times, the lidar measurements significantly deviate from the normal range. These measurements are considered to be aberrant values.

As previously indicated, the invention detects and removes aberrant values from the lidar measurements.

To do this, a first step of the method for detecting aberrant values in real time acquires and models measurement rws(k) with the lidar sensor of an incident wind field. This step will be described in more detail in the rest of the description.

A second step carried out with the lidar estimates the median and the mean absolute deviation in real time of the lidar measurements that will subsequently be used to detect aberrant values.

In statistics, the median is the value separating the lower half from the upper half of a data sample. For a dataset, it may be considered to be the middle value. For example, in a dataset {1, 3, 3, 6, 7, 8, 9}, the median is 6, the fourth highest and the fourth lowest number of the sample. The main advantage of the median in the description of data, with respect to the mean, is that it is not distorted by extremely high or extremely low values, this making it obtaining a better value of the typical value. In other words, the median is much more robust with respect to aberrant values than the mean. In the case of symmetric data, the mean and the median are equal.

The invention comprises a procedure for computing the median of the 2 nm+1 lidar-measurement data.

In the following example, which is illustrated in FIGS. 1 and 3, only measurement with one beam for one distance is considered. However, the approach is directly extendable to all the beams and to all the distances.

The detecting method comprises an algorithm that estimates the median in real time. The data used are listed below:
Parameter: Number of data 2 nm+1
Input: Lidar measurements rws(k)
Output: Median mr(k)
Initialization: j=1
The algorithm operates in the following way at each time k:
1. If j≤2 nm+1
    a) rp(j)=rws(k)
    b) j=j+1
    c) Go to 1.
2. Otherwise:
    a) rp(1: 2 nm)=rp(2: 2 nm+1)
    b) rp(2 nm+1)=rws(k)
    c) Sort the vector rp into increasing order.
3. The median mr(k) is computed as mr(k)=rp(nm).
This algorithm only requires storage and sorting operations, which are extremely simple.

For the problem of detecting aberrant values, estimating the mean absolute deviation is necessary. In mathematics, the mean absolute deviation of a dataset is the mean of the absolute deviations with respect to a central point, that is for a set X={x1, x2, . . . , xn}, the mean absolute deviation is computed as:

$$d_r = \frac{1}{n}\sum_{i=1}^{n}|x_i - m(X)|$$

The central point m(X) may be the mean, the median or the mode. For the sake of robustness with respect to the aberrant values, the median mr(k) is chosen as m(X).

The mean absolute deviation is a measurement used to quantify the amount of variation or dispersion in a set of data values. A low absolute deviation indicates that the data points have a tendency to be close to the central point of the set, whereas a high absolute deviation indicates that the data points are distributed over a wider range of values. The main advantage of the mean absolute deviation with respect to the standard deviation is that it is much more robust than the standard deviation with respect to aberrant values.

Below, an algorithm for computing the mean absolute deviation of the lidar data np. measured beforehand is provided. For greater simplicity, only measurement with one beam for one distance is considered.

To this end, the data used by the algorithm are listed below:
Parameter: Number of data np
Input: Lidar measurement rws(k)
Output: Mean absolute deviation dr(k)
Initialization: j=1
At each time k:
1. If j≤np
    a) dp(j)=rws(k)
    b) j=j+1
    c) Go to 1.
2. Otherwise
    a) dp(1:np−1)=dp(1:np)
    b) dp(np)=rws(k)
3. The algorithm for estimating the median in real time is used to estimate the median mr(k).
4. The mean absolute deviation dr(k) is computed as:

$$d_r(k) = \frac{1}{n_p}\sum_{i=1}^{n_p}|d_p(i) - m_r(k)|$$

In this section, a procedure for detecting the aberrant values in real time using the estimated median mr(k) and the estimated mean absolute deviation dr(k) is used. It will be recalled that the median may be considered to be the middle value, by virtue of which the mean absolute deviation dr(k) quantifies the amount of variation in or a dispersion of a set of data values.

In order to detect the aberrant values, it is assumed that the lidar measurements rws(k) cannot change so rapidly, that is the difference |rws(k)−mr(k)| is small. More precisely, it is assumed that:

$$|rws(k) - m_r(k)| \leq \sigma d_r(k)$$

where σ is a positive scalar.
In this way, all the lidar measurements that do not satisfy the preceding equation are considered to be aberrant values.

Thus the method for detecting aberrant values is comprised in an algorithm for detecting aberrant values that may be summarized as follows:
The parameters of this algorithm are:
Input: Lidar measurement rws(k)
Output: Detect whether rws(k) is an aberrant value or not.
Thus, at each time k, the algorithm performs the following operations:
1. Using the algorithm to estimate the median mr(k).
2. Using the algorithm to estimate the mean absolute deviation dr(k).
3. If |rws(k)−mr(k)|≤σdr(k), then rws(k) is not an aberrant value.
It may be used in a wind-field reconstruction algorithm.
4. Otherwise: rws(k) is an aberrant value.

According to one implementation of the invention, the method comprises a step of reconstructing the measurement of the lidar sensor, by removing the detected aberrant values from the modelled measurement rws(k).

Thus, a clean measurement signal without aberrant values is obtained.

Figure 4:
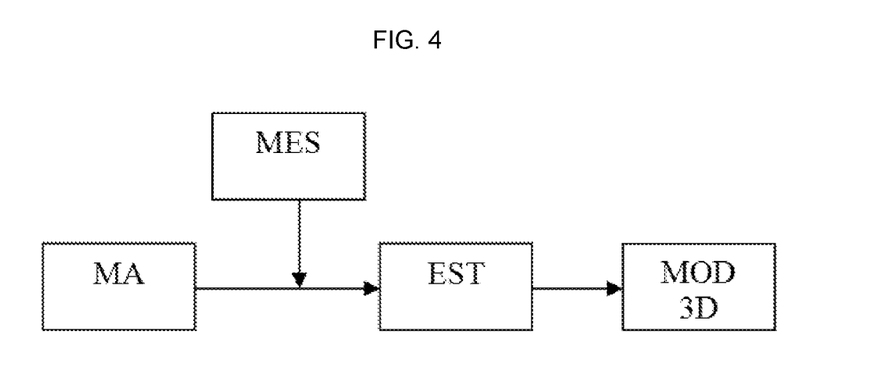
FIG. 4 illustrates the steps of the method for acquiring and modelling with the lidar sensor according to the invention.

FIG. 4 shows the various steps of the acquiring and modelling method according to one embodiment of the invention: Other variant embodiments of the acquiring and modelling process known to those skilled in the art are suitable for the method according to the invention.

1. Generating a mesh (MA) of the space located upstream of the lidar sensor, the mesh comprising estimation points (PE) and measurement points (PM).
2. Measuring (MES) the amplitude and the direction of the wind at the various measurement points (PM).
3. Estimating (EST) the amplitude and the direction of the wind at any time (t) for all of the estimation points (PE).
4. Reconstructing (MOD 3D) the incident wind field in three dimensions (3D) and in real time at all of the discrete points.

FIG. 3 shows a wind turbine 1 equipped with a lidar sensor 2. The lidar sensor 2 is used to measure the wind speed at a given distance and at a measurement point PM. Knowledge in advance of the wind measurement in principle makes it possible to generate a lot of information.

There are a multiple types of lidar sensors, for example scanned lidar sensors, continuous lidar sensors or pulsed lidar sensors. In the context of the invention, a pulsed lidar is preferably used. However, other lidar technologies may be used while remaining within the scope of the invention. As may be seen in [FIG. 1], which is one example embodiment, the lidar used comprises 5 beams or measurement axes (b0, b1, b2, b3, b4). Nonlimitingly, the acquiring and modelling method also operates with a lidar comprising three or more beams. The pulsed 5-beam lidar sensor is mounted on a nacelle 3 of a wind turbine 1.

Conventionally, a wind turbine 1 allows the kinetic energy of the wind to be converted into electrical or mechanical energy. For the conversion of the wind into electrical energy, the wind turbine is composed of the following elements:

- a mast 4 allowing a rotor (not shown) to be placed at a sufficient height to allow it to move (required for horizontal-axis wind turbines) or this rotor to be placed at a height allowing it to be driven by a wind that is stronger and more regular than at the level of the ground 6. The mast 4 generally houses some of the electrical and electronic components (modulator, command unit, multiplier, generator, etc.);
- a nacelle 3 mounted at the top of the mast 4, housing mechanical, pneumatic components and certain electrical and electronic components (not shown) required for the operation of the machine. The nacelle 3 may turn to orient the machine in the correct direction;
- the rotor, fastened to the nacelle, comprising a plurality of blades 7 (in general three) and the nose cone of the wind turbine. The rotor is driven by the energy of the wind, it is connected by a mechanical shaft directly or indirectly (via a gearbox and mechanical shaft system) to an electrical machine (electrical generator, etc.) (not shown) that converts the harvested energy into electrical energy. The rotor is potentially equipped with control systems such as variable-angle blades or aerodynamic brakes;
- a transmission, composed of two axles (mechanical shaft of the rotor and mechanical shaft of the electrical machine) that are connected via a transmission (gearbox) (not shown).

In the description given below, the described acquiring and modelling method is theoretical and works independently of the wind turbine 1. However, the various examples and developments are given in the case of a lidar mounted on the nacelle 3 of the wind turbine 1 and hence the various steps of the acquiring and modelling method that are shown in FIG. 4 are carried out at a certain altitude with respect to the ground 6.

In this part, the various steps of the acquiring and modelling method according to the invention are described:

1. Generating a Mesh (MA) of the Space Located Upstream of the Lidar Sensor

Figure 5:
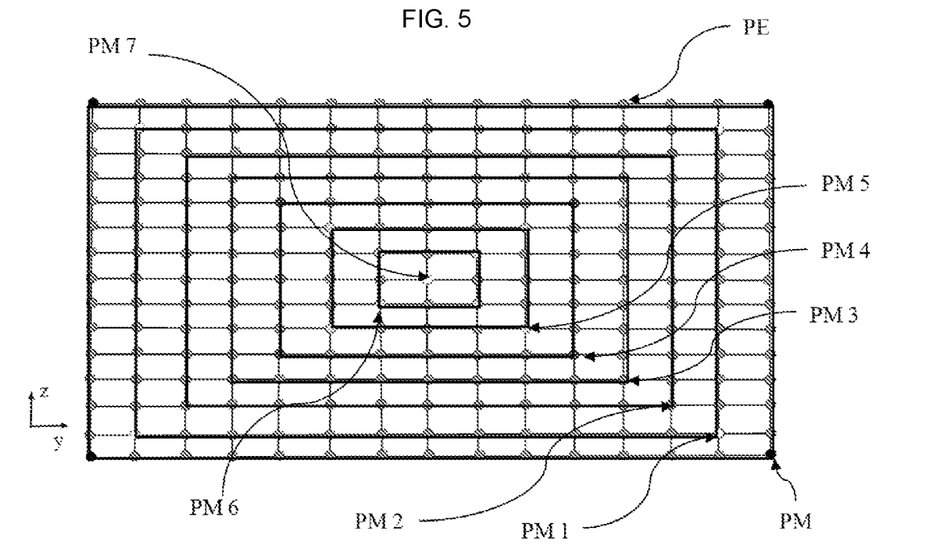
FIG. 5 is a face-on view of the mesh of the space according to the invention.
Figure 6:
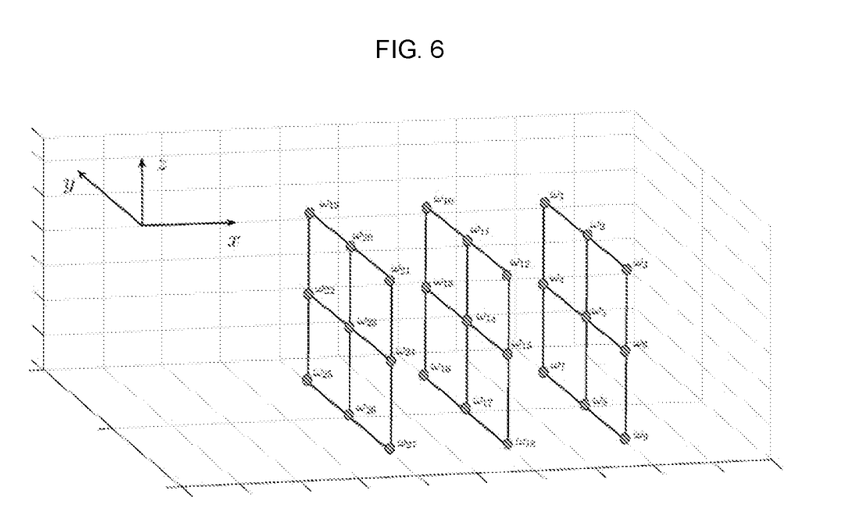
FIG. 6 is a perspective view of the mesh of the space according to the invention.

In this first step, the space upstream of the lidar sensor is defined into a mesh, as shown in FIGS. 3, 5 and 6. In this step, a coordinate system in which the lidar performs the measurements is defined. The defined coordinate system is the direct system of axes illustrated in FIGS. 3 and 5. The x-y origins of this system are at the level of the position of the lidar on the nacelle 3, and the z origin is at the level of the ground 6.

The x-axis points horizontally in the direction of the wind, the z-axis points vertically upward and the y-axis is perpendicular in order to form a direct three-dimensional coordinate system (in accordance with the right-hand rule).

In this step, the generation of the mesh of the space comprises generating a set of discrete points placed upstream and that define a three-dimensional grid. For each given distance x, the y-z plane is divided into cells without overlap as shown in FIG. 5. The mesh comprises measurement points (PM) and estimation points (PE) at which the wind speed is measured and estimated, respectively.

In relation to this mesh of the space, underlying variables, called optimization variables, which are necessary for the estimating step described below, are also defined. In order to allow a clever and effective implementation of the optimization algorithm described below, all the optimization variables are assembled into an ordered vector, which is denoted ω. The determined order of these optimization variables is an engineering element that is crucial to the feasibility and performance of a coding algorithm of this method.

A vector ω is defined for each point of the discretized space, and it is composed of all the components $v_x$ of the points (PE) of the space where the wind is estimated, followed respectively by the components $v_y$ and $v_z$. The estimation of the wind speed at n points involves constructing a vector ω of 3n size, with $w_1$ to $w_n$ containing all the $v_x$, $w_{n+1}$ to $w_{2n}$ containing all the $v_y$, and $w_{2n+1}$ to $w_{3n}$ containing all the $v_z$.

The following example is given for the components $v_x$ of the wind speed, but it will be understood that the method is identical for $v_y$ and $v_z$. As was done in the initial step, and as shown in FIG. 5, the space is discretized in x, y and z with $n_x$ points in x, $n_y$ points in y and $n_z$ points in z.

In this configuration:

$$n = n_x n_y n_z$$

The component $v_x$ of the wind speed the coordinates of which is $(x_i, y_j, z_k)$ is defined by $v_{i,j,k}$. The index l of $w_l$, at which the corresponding estimation is located, is obtained thus:

$$l = (n_x - i)n_y n_z + (k-1)n_y + j$$

For example, if $i = n_x$, $k = 1$ and $j = 1$, then $$l = (n_x - i)n_y n_z + (k-1)n_y + j = 1$$

This corresponds to the top left corner of the estimation domain, at the distance most upstream from the rotor plane, as illustrated in FIG. 6.

2. Measuring (MES) the Amplitude and the Direction of the Wind at the Various Measurement Points In a second step, the lidar sensor carries out a measurement m(t) relating to the wind speed at a measurement point (PM) located upstream of the wind turbine 1. This measurement m(t) corresponds to the signal received by the sensor coming from the measurement point (PM) in response to the signal emitted by the lidar sensor. Specifically, via interferometry and the Doppler effect, a portion of the laser signal emitted by the lidar sensor is reflected by air molecules at the measurement point and also by aerosols (dust and microparticles in suspension). The measurement point is defined by the characteristics of the lidar sensor, in particular its focal length, and by its orientation. This measurement, which is dependent on the wind speed, is a time and depends on the orientation of the lidar sensor.

For the study of a case of a pulsed lidar, the measurements are obtained successively on the mesh defined in the preceding step, starting with the longitudinal beam b0, then the oblique beam b1, up to the beam b4. One advantageous feature of this system is that it allows the projection of the wind speed to be measured at a plurality of distances, simultaneously, for a given beam. It is thus possible to for example obtain 10 successive distances between 50 m and 400 m, at a sampling rate of 0.25 Hz or of 1 Hz. It is of course possible to limit the measurements to two measurements, which are sufficient to reconstruct a three-dimensional model. At each sampling time, only the measurements of the selected current beam are refreshed.

In one particular case, according to FIG. 6, the measurements are made at seven distances and in particular at x=[50 80 120 160 200 240 280] m for the five beams. Thus, for each given x, the y-z plane is divided into cells as follows:

Four first points (PM) corresponding to the y-z coordinates of the measurement points for the beams 1, 2, 3, 4 at the distance x=280 m.

Four second points (PM1) corresponding to the y-z coordinates of the measurement points for the beams 1, 2, 3, 4 at the distance x=240 m.

Four third points (PM2) corresponding to the y-z coordinates of the measurement points for the beams 1, 2, 3, 4 at the distance x=200 m.

Four fourth points (PM3) corresponding to the y-z coordinates of the measurement points for the beams 1, 2, 3, 4 at the distance x=160 m.

Four fifth points (PM4) corresponding to the y-z coordinates of the measurement points for the beams 1, 2, 3, 4 at the distance x=120 m.

Four sixth points (PM5) corresponding to the y-z coordinates of the measurement points for the beams 1, 2, 3, 4 at the distance x=80 m.

Four seventh points (PM6) corresponding to the y-z coordinates of the measurement points for the beams 1, 2, 3, 4 at the distance x=50 m.

The central point (PM7) corresponds to the y-z coordinates of the measurement points for beam 0 for all the distances.

The lidar measurements m(k) for the beams j=0, 1, 2, 3, 4 at the distance x metres, and at the time k are given by the formula mj, x(k), with j=0, 1, 2, 3, 4.

For example, $m_{0,50}(1)$ is the lidar measurement for the beam j=0 at the distance x=50 meters and at the instant of time k=1. In the context of the invention, the lidar measurement is then given by a formula of the type:

$$m_{j,x}(k) = a_j v_{j,x}(k) + b_j v_{j,y}(k) + c_j v_{j,z}(k)$$

where $v_{j,x}(k)$, $v_{j,y}(k)$, $v_{j,z}(k)$ are wind-speed values projected into a given coordinate system at the initial time (k), and $a_j$, $b_j$, $c_j$, with j=0, 1, 2, 3, 4 are measurement coefficients, which are given by, $$\begin{cases} a_j = \cos(\theta_j), \\ b_j = \sin(\theta_j)\cos(\varphi_j), \\ c_j = \sin(\theta_j)\sin(\varphi_j) \end{cases}$$

where θj, φj, with j=0, 1, 2, 3, 4 are the zenith and the azimuth of the measurement axis in a spherical coordinate system, respectively.

The advantage of defining the lidar measurement equation in the coordinate system defined above, with the selected choice of spatial discretization, is that it may be used directly, since the coordinates of the measurement point coincide with one particular point of the discretized space.

3. Estimating (EST) the Amplitude and the Direction of the Wind at any Time (t) at all of the Discrete Points This step obtains a value of the wind at the estimation points (PE) of the mesh.

To this end, the estimation is carried out by use of the optimization, using a weighted recursive least-squares method, of a cost function that uses the measured lidar data m(k), but also spatial wind-speed coherence data, temporal wind-speed variation data, and data qualifying the quality of the lidar measurements m(k). This is explained below.

3.1 Spatial Differences

These subsections define the spatial wind coherence data used in the context of the invention and more particularly in the context of a lidar mounted on the nacelle 3 of a wind turbine 1.

In this step, the components of the wind speed on the axes x, y and z of the coordinate system defined above are considered.

In this estimating step, it is assumed that the wind speed changes relatively little in the space, and that the wind has a high spatial coherence in a small volume of the space. The following description is given here for the components $v_x$, that is for the first n variables of ω, with an estimation domain shown in FIG. 6 (the approach is similar for the components $v_y$ and $v_z$), and setting $n_x = n_y = n_z = 3$.

3.1.1 Longitudinal Difference

The longitudinal difference corresponds to the change in $v_x$ along the x-axis and it changes smoothly according to the invention. In this case, the partial derivative $dv_x/dx$ is relatively small. In other words, $$\begin{cases} \omega_1 - \omega_{10} \approx 0 \\ \omega_2 - \omega_{11} \approx 0 \\ \vdots \\ \omega_{18} - \omega_{27} \approx 0 \end{cases}$$

The preceding equation may be written in a compact vector form as:

$$C_{xl}\omega \approx 0$$

where $$C_{xl} = \begin{bmatrix} +1 & 0 & \cdots & 0 & -1 & 0 & \cdots & 0 \\ 0 & +1 & \cdots & 0 & 0 & -1 & \cdots & 0 \\ \vdots & \vdots & \ddots & \vdots & \vdots & \vdots & \ddots & \vdots \\ 0 & 0 & \cdots & +1 & 0 & 0 & \cdots & -1 \end{bmatrix}$$

It will be noted that each row of $C_{xl}$ contains one +1 and one −1.

Analogously, it is possible to compute the variation in $v_y$ and $v_z$ along the longitudinal axis as:

$$\begin{cases} C_{yl}\omega \approx 0, \\ C_{zl}\omega \approx 0 \end{cases}$$

where $C_{yl}$, $C_{zl}$ are matrices of coefficients that contain only one +1 and one −1 in each row.

Defining:

$$C_l = \begin{bmatrix} C_{xl} \\ C_{yl} \\ C_{zl} \end{bmatrix}$$

the following equation is obtained:

$$C_l \omega \approx 0$$

which characterizes the variation in the wind speed for the estimation domain along the longitudinal axis.

3.1.2 Lateral Difference

The lateral difference is the change in $v_x$ along the y-axis. Analogously, since the wind changes without discontinuity, the partial derivative $dv_x/dy$ is relatively small. In other words, $$\begin{cases} \omega_1 - \omega_2 \approx 0 \\ \omega_2 - \omega_3 \approx 0 \\ \vdots \\ \omega_{26} - \omega_{27} \approx 0 \end{cases}$$

It is possible to write the preceding equation in a compact vector form as $$C_{xt}\omega \approx 0$$

where $$C_{xt} = \begin{bmatrix} +1 & -1 & 0 & \cdots & 0 & 0 & 0 & \cdots & 0 & 0 \\ 0 & +1 & -1 & \cdots & 0 & 0 & 0 & \cdots & 0 & 0 \\ \vdots & \vdots & \vdots & \ddots & \vdots & \vdots & \vdots & \ddots & \vdots & \vdots \\ 0 & 0 & 0 & \cdots & 0 & 0 & 0 & \cdots & +1 & -1 \end{bmatrix}$$

Each row of $C_{xt}$ contains one +1 and one −1.

Analogously, the variation in $v_y$ and $v_z$ along the lateral axis may be computed as, $$\begin{cases} C_{yt}\omega \approx 0, \\ C_{zt}\omega \approx 0 \end{cases}$$

where $C_{yt}$, $C_{zt}$ are matrices of coefficients that contain only one +1 and one −1 in each row.

Defining:

$$C_t = \begin{bmatrix} C_{xt} \\ C_{yt} \\ C_{zt} \end{bmatrix}$$

It is clear that the equation:

$$C_t \omega \approx 0$$

characterizes the variation in the wind speed for the estimation domain along the lateral axis.

3.1.3 Vertical Difference

The vertical profile of the wind speed is given by a power law, which makes possible obtaining a description of the wind-speed component $v_x$ at various heights that is much more precise.

The vertical profile of the wind speed describes the variation in the longitudinal wind speed as a function of the altitude relative to the ground. The power law of the wind-speed profile is generally used to estimate the longitudinal wind speed at an altitude $z$ above the ground, taking into account the longitudinal wind speed $v_{lr}$ at a reference altitude $z_r$, using the equation, $$v_l = v_{lr}\left(\frac{z}{z_r}\right)^\alpha$$

where alpha is the exponent of the power law, which is generally specified dependent on stability. The constant value alpha=⅐ is commonly used, consistently with an assumption of a relatively low wind shear. However, it should be noted that considering alpha to be constant amounts to ignoring the roughness of the surface of the ground, interactions of the wind with potential obstacles, and the stability of the atmosphere.

Using this power law, the vertical difference of the wind is thus given by:

$$\begin{cases} \omega_1 - \left(\frac{z_1}{z_4}\right)^\alpha \omega_4 \approx 0 \\ \omega_2 - \left(\frac{z_2}{z_3}\right)^\alpha \omega_5 \approx 0 \\ \vdots \\ \omega_{24} - \left(\frac{z_{24}}{z_{27}}\right)^\alpha \omega_{27} \approx 0 \end{cases}$$

where $z_j$ is the height of $\omega$, and $\alpha$ is the exponent of the power law, which is assumed to be $1/7$. It is possible to write the preceding equation in a compact vector form as:

$$C_{xv}\omega \approx 0$$

where $$C_{xv} = \begin{bmatrix} +1 & 0 & 0 & -\left(\frac{z_1}{z_4}\right)^\alpha & 0 & 0 & \ldots & 0 & 0 & 0 & 0 \\ 0 & +1 & 0 & 0 & -\left(\frac{z_2}{z_3}\right)^\alpha & 0 & \ldots & 0 & 0 & 0 & 0 \\ \vdots & \vdots & \vdots & \vdots & \vdots & \vdots & \ddots & \vdots & \vdots & \vdots & \vdots \\ 0 & 0 & 0 & 0 & 0 & 0 & \ldots & +1 & 0 & 0 & -\left(\frac{z_{24}}{z_{27}}\right)^\alpha \end{bmatrix}$$

Analogously, it is possible to quantify the variation in $v_y$ and $v_z$ along the vertical axis as:

$$\begin{cases} C_{yv}\omega \approx 0, \\ C_{zv}\omega \approx 0 \end{cases}$$

However, as the power law of the profile of the wind applies only to the longitudinal wind speed, $C_{yv}$ and $C_{zv}$ contain only one $+1$ and one $-1$ in each row.

Defining:

$$C_v = \begin{bmatrix} C_{xv} \\ C_{yv} \\ C_{zv} \end{bmatrix}$$

The following equation is obtained:

$$C_v\omega \approx 0$$

which characterizes the variation in the wind speed for the estimation domain along the vertical axis.

axis
Lastly, using $$C_l\omega \approx 0$$

and $$C_t\omega \approx 0$$

the following may be stated:

$$\begin{cases} C_l\omega \approx 0, \\ C_t\omega \approx 0, \\ C_v\omega \approx 0 \end{cases}$$

or equivalently, $$C_s\omega \approx 0$$

which is the equation that characterizes the total variation in wind speed along the x-, y- and z-axes.

With:

$$C_s = \begin{bmatrix} C_l \\ C_t \\ C_v \end{bmatrix}$$

3.2 Lidar Measurements

For the sake of the computation, it is important to rewrite the measurement equation in the vector form of W. In the preceding example of a five-beam lidar and for seven measurements per beam, j=0, 1, 2, 3, 4, and x=[50, 80, 120, 160, 200, 240, 280], $$\begin{cases} v_{j,x} = [0 \ldots 0\ 1\ 0 \ldots 0]\omega = C_{j,xx}\omega \\ v_{j,y} = [0 \ldots 0\ 1\ 0 \ldots 0]\omega = C_{j,xy}\omega \\ v_{j,z} = [0 \ldots 0\ 1\ 0 \ldots 0]\omega = V_{j,xz}\omega \end{cases}$$

In combination with:

$$m_{j,x}(k) = a_j v_{j,x}(k) + b_j v_{j,y}(k) + c_j v_{j,z}(k)$$

the following is obtained, $$m_{j,x} = C_{j,x}\omega$$

where $$C_{j,x} = [a_j\ b_j\ c_j] \begin{bmatrix} C_{j,xx} \\ C_{j,xy} \\ C_{j,xz} \end{bmatrix}$$

which may be rewritten in a compact vector form:

$$C_m\omega = m_m$$

where $$m_m = \begin{bmatrix} m_{0,50} \\ m_{1,50} \\ \vdots \\ m_{4,280} \end{bmatrix}, \quad C_m = \begin{bmatrix} C_{0,50} \\ C_{1,50} \\ \vdots \\ C_{4,280} \end{bmatrix}$$

In order to take into account measurement noise, a more realistic model for the lidar measurements may be introduced as follows, $$C_m\omega = m_m + \epsilon_m$$

where $\epsilon_m$ describes the measurement noise.

3.3 Weighted Recursive Least-Squares Method

It is assumed that the wind speed changes little in the space, and over time. Below, a method for taking into account this information in the optimization approach is provided. $\hat{\omega}(0)$ is the estimation of the wind speed at the time 0. At each time, the optimization problem is the following:

$$\min_{\omega(t)} J(t)$$

with:

$$J(t) = (\omega(0) - \hat{\omega}(0))^T P_0^{-1}(\omega(0) - \hat{\omega}(0)) +$$

$$\sum_{j=1}^{t}(\omega(j) - \omega(j-1))^T Q^{-1}(\omega(j) - \omega(j-1)) +$$

$$\sum_{j=1}^{t}\omega(j)^T C_s^T R_s^{-1} C_s\omega(j) + \sum_{j=1}^{t}(C_m\omega(j) - m_m)^T R_m^{-1}(C_m\omega(j) - m_m(j))$$

There are four terms in the preceding cost function:

The first term penalizes knowledge of the initial wind speed ω(0).

The second term penalizes the variation in the wind speed over time.

The third term penalizes the variation in the wind speed in the space.

The fourth term penalizes the lidar measurement quality.

Using the preceding formula, it is possible to achieve a clear interpretation of the weighting matrices $P_0$, Q, $R_s$ and $R_m$. Thus:

If the wind speed ω(t) at the time t=0 is well known, then $\omega(0)=\hat{\omega}(0)$, then $P_0$ is small. Otherwise $P_0$ is large.

If there are many variations in the wind speed over time, then Q is large.
Otherwise Q is small.

If the wind speed changes rapidly, then $R_s$ is large. Otherwise $R_s$ is small.

If there is a lot of noise in the lidar measurements, then $R_m$ is large. Otherwise, $R_m$ is small.

Let the three following limiting cases be considered:

No information on the initial wind speed is available. Therefore $P_0$
is very large. The term:

$$(\omega(0)-\hat{\omega}(0))^T P_0^{-1}(\omega(0)-\hat{\omega}(0))$$

may thus be neglected in the cost function.

There is no relationship between the wind speed at the time t and the wind speed at the time t−1. In this case, it is possible to choose Q to be very large. The following term may be neglected:

$$\sum_{j=1}^{t}(\omega(j)-\omega(j-1))^T Q^{-1}(\omega(j)-\omega(j-1))$$

The variation in the wind speed in the space is very small. In this case, it is possible to make $R_s$ very small. The following term is important in the cost function:

$$\sum_{j=1}^{t}\omega(j)^T C_s^T R_s^{-1} C_s \omega(j)$$

The following are defined:

$$C=\begin{bmatrix}C_s\\C_m\end{bmatrix}, R=\begin{bmatrix}R_s & 0\\0 & R_m\end{bmatrix}$$

The weighted recursive least-squares method used to solve the optimization problem is defined in the following way:

The optimization variables are initialized in the following way:

$$\begin{cases}\omega(0)=\hat{\omega}(0),\\P(0)=P_0\end{cases}$$

At each time t:
the following is defined:

$$y(t)=\begin{bmatrix}0\\y_m(t)\end{bmatrix}$$

Where 0 is a zero vector of suitable size.
An auxiliary matrix K is computed such that $$K=(P(t-1)+Q)C(C^T(P(t-1)+Q)C+R)^{-1}$$

The matrix P(t) is computed such that $$P(t)=(I-KC)P(t-1)$$

where I is an identity matrix of suitable size.
The wind speed at the time t is then estimated thus:

$$\omega(t)=\omega(t-1)+K(y(t)-C\omega(t-1))$$

4. Reconstruction of the Incident Wind Field in Three Dimensions (3D) and in Real Time In this step, a processor integrated into the lidar sensor collects all of the wind-amplitude and wind-direction data measured and estimated during the preceding steps. The collection of these data is carried out in real time for each precedingly defined measurement and estimation point (PM, PE). Thus the lidar sensor is able to reconstruct all of the wind field incident on the lidar, as shown in FIG. 7.

Figure 7:
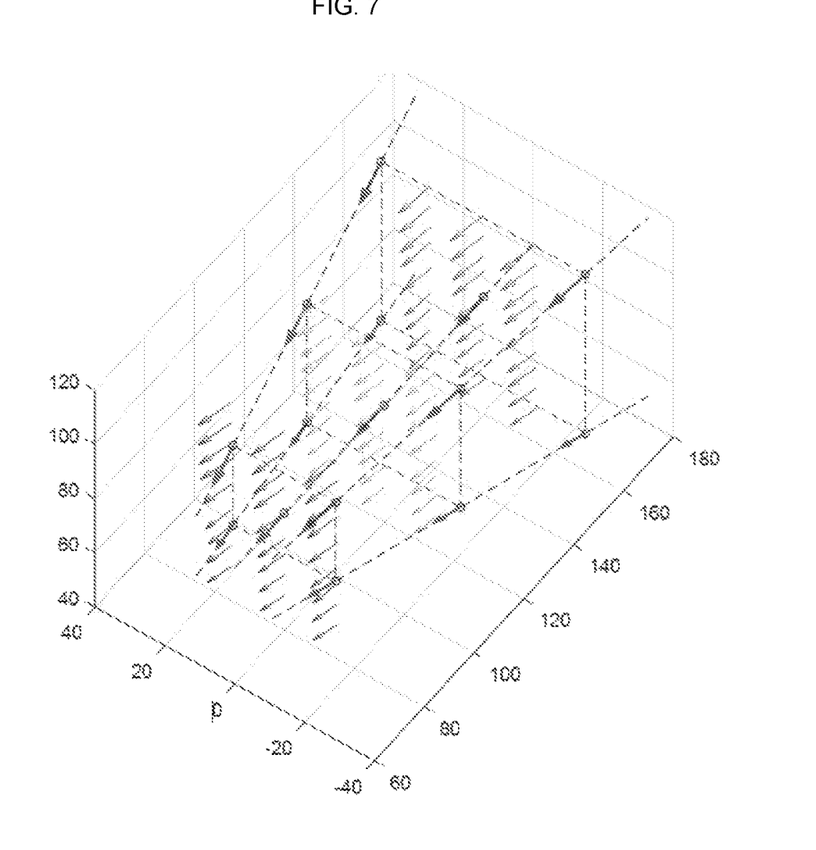
FIG. 7 illustrates a wind field in 3D reconstructed from the lidar measurements in one particular case.

In [FIG. 7], a reconstructed wind field is shown for a time of 68 seconds. The y-axis represents the altitude relative to the ground (in m) and the x-axes represent the distance to the nacelle (in m) and lateral positions relative to the lidar (in m).

The invention secondly relates to a method for at least one of controlling and monitoring a wind turbine equipped with a lidar sensor such as described above and an associated programmable logic controller 10 that comprises the following steps:

i) generating an anticipatory control strategy (CON) for controlling the wind turbine 1 and exploiting the reconstruction of the incident wind field in three dimensions and in real time obtained using the method according to the invention;

ii) a control (PIL), incorporating the generated control strategy, which in particular controls the angle of the blades 7 or the orientation of the nacelle 3.

Figure 8:
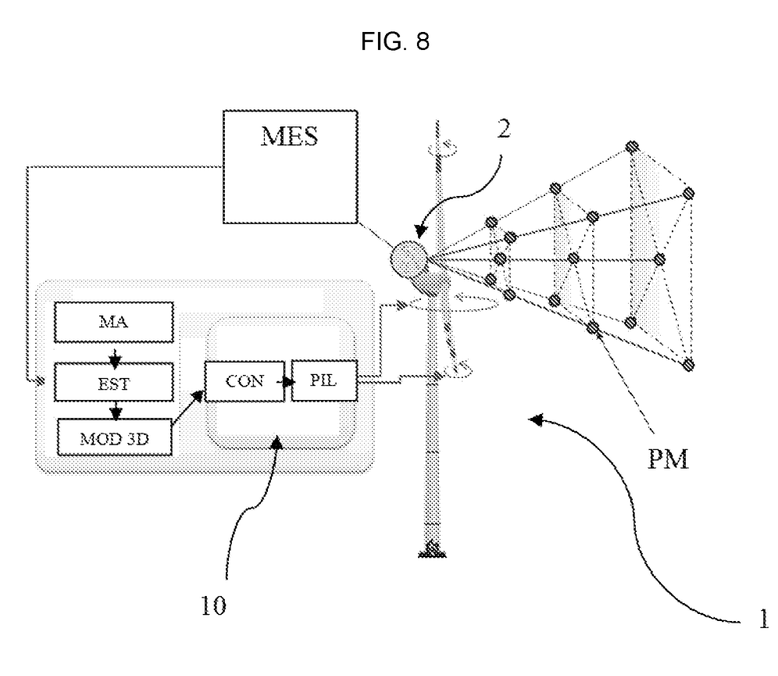
FIG. 8 illustrates the steps of the method for controlling the wind turbine according to the invention.

FIG. 8 shows the overall operation of such a wind turbine 1. The wind turbine 1 comprises to this end a lidar sensor 2 according to the invention, and its processing unit, a computational device comprising a software solution for reconstructing in 3D the wind field, a programmable logic controller incorporating the control strategy and a device for controlling at least one of the blades and the nacelle of the wind turbine. With reference to FIG. 8, the invention applied to a wind turbine works in the following way:

First, the lidar performs the step of acquiring and modelling the incident wind field such as described above to reconstruct a 3D incident wind field (steps ME, MA, EST and MOD 3D in FIG. 8), Second, the programmable logic controller 10 generates the control strategy (CON) and controls (PIL) units of the wind turbine 1 taking into account the generated control strategy.

This method according to the invention makes possible analysis in real-time the incident wind or to detect gusts, power curves and the strength of turbulence. This may possibly be applied to regulate or monitor the wind turbine to obtain a better alignment of the wind turbine, this leading to an optimization of production and a minimization of loads and of fatigue.

The invention claimed is:

1. A method of controlling and monitoring a wind turbine equipped with a lidar sensor and a programmable logic controller, comprising:
    acquiring a modelling measurement rws(k) with the lidar sensor of an incident wind field by estimating a median mr(k) and a mean absolute deviation dr(k) in real time measurements of the incident wind field;
    detecting aberrant values in real time using the estimated median mr(k) and the mean absolute deviation dr(k), by using a relationship |rws(k)−mr(k)|≤σdr(k) where σ is a positive scalar, rws(k) are input Lidar measurements, mr(k) are an output median, and dr(k) is an output mean absolute deviation of the input Lidar measurements; and
    disregarding the detected aberrant values of the incident wind field in a space located upstream of the lidar sensor while controlling the wind turbine by using the programmable logic controller to control an angle of blades of the wind turbine or an orientation of the wind turbine.

2. The method according to claim 1, wherein the mean absolute deviation dr(k) in real time of the incident wind field is given by a formula:

$$d_r = \frac{1}{n}\sum_{i=1}^{n} |x_i - m(X)|$$

wherein x is a coordinate in a defined system and m(X) is a center point.

3. The method according to claim 1, comprising reconstructing measurement of the lidar sensor, by removing the detected aberrant values from the modeled measurement rws(k).

4. The method according to claim 1, wherein acquiring with the lidar sensor an incident wind field in the space located upstream of the lidar sensor comprises:
    a) generating a mesh of the space located upstream of the lidar sensor using a set of discrete points positioned in a predefined three-dimensional grid comprising a set of cells composed of estimation points and of measurement points;
    b) measuring amplitude and direction of the wind at measurement points located upstream in the space positioned at least two different distances from the lidar sensor along at least three measurement axes;
    c) estimating the amplitude and direction of the wind at any time at all estimation points, the estimation being carried out by optimization, using a weighted recursive least-squares method, of a cost function using at least data of the measurement points, spatial wind-speed coherence data, temporal wind-speed coherence data, and data qualifying quality of the measurements carried out at the measurement points; and
    d) reconstructing, in real time and in a defined coordinate system, the incident wind field in three dimensions from wind amplitudes and directions estimated and measured for each point of the mesh.

5. The method according to claim 4, wherein the measurement m of the amplitude and direction of the wind at a measurement point mj,x(k) is given by a relationship:

$$m_{j,x}(k) = a_j v_{j,x}(k) + b_j v_{j,y}(k) + c_j v_{j,z}(k)$$

where $v_{j,x}(k)$, $v_{j,y}(k)$, $v_{j,z}(k)$ are wind-speed values projected into a given coordinate system at an initial time (k), and $a_j$, $b_j$, $c_j$ with j=0, 1, 2, 3, 4 are measurement coefficients, which are given by $$\begin{cases} a_j = \cos(\theta_j), \\ b_j = \sin(\theta_j)\cos(\varphi_j), \\ c_j = \sin(\theta_j)\sin(\varphi_j) \end{cases}$$

and
    θj, φj, j=0, 1, 2, 3, 4 are, respectively, a zenith and an azimuth of the measurement axis in a spherical coordinate system.

6. The method according to claim 5, wherein a cost function J at any time (t) is written as:

$$J(t) = (\omega(0) - \hat{\omega}(0))^T P_0^{-1}(\omega(0) - \hat{\omega}(0)) + \sum_{j=1}^{t}(\omega(t) - \omega(j-1))^T Q^{-1}(\omega(j) - \omega(j-1)) + \sum_{j=1}^{t}\omega(j)^T C_s^T R_s^{-1} C_s \omega(j) + \sum_{j=1}^{t}(C_m\omega(j) - m_m)^T R_m^{-1}(C_m\omega(j) - m_m(j))$$

in which ω is an ordered vector composed of all components of wind speed at points of the space at which the wind is estimated, $\hat{\omega}(0)$ is estimation of wind speed at time 0, P0, Q, Rs and Rm are weighting matrices, and Cs and Cm are matrices account for the wind speed and the measurement noise.

7. The method according to claim 6, wherein the measurements of amplitude and wind direction at measurement points are carried out at a sampling rate of at least 0.25 Hz.

8. The method according to claim 6, wherein the measurements of amplitude and wind direction at measurement points are carried out at least two different distances along the measurement axis.

9. The method according to claim 4, wherein the measurements of the amplitude and wind direction are taken along at least three measurement axes.

10. The method according to claim 4, wherein spatial coherence of wind speed along x, y and z axes in a Cartesian coordinate system is estimated with a formula:

$$C_s \omega \approx 0$$

with:

$$C_s = \begin{bmatrix} C_l \\ C_t \\ C_v \end{bmatrix}$$

where:
    $C_l$ characterizes variation in wind speed for an estimation domain along an x axis and
    $C_t$ characterizes variation in wind speed for an estimation domain along a y axis and $C_v$ characterizes variation in wind speed for an estimation domain along a vertical z axis and the vector $\omega$ is an ordered vector composed of all components of wind speed at the points in the space at which the wind is estimated.

11. The method according to claim 4, wherein the coherence of wind speed along the x, y and z axes of the Cartesian coordinate system is estimated under assumptions of:

variation in wind speed is along the longitudinal x axis and a partial derivative $dv_x/dx$ is along a longitudinal x axis;

wind changes without discontinuity along the y axis and the partial derivative $dv_x/dy$ is along the y axis; and wind changes along the z axis are according to a power law, given by an equation:

$$v_l = v_{lr}\left(\frac{z}{z_r}\right)^\alpha$$

where $\alpha$ is an exponent of a power law, $v_l$ is longitudinal wind at an altitude z above ground, and $z_r$ is a reference altitude.

12. The method according to claim 4, wherein the measurements by the lidar sensor are represented using a model defined by:

$$C_m\omega = m_m + \epsilon_m$$

with $E_m$ describing measurement noise.

13. A computer-program product comprising code instructions which, when executed by a processor of the lidar sensor, steps of a method implemented for detecting with the lidar sensor the incident wind field according to claim 1.

14. A lidar sensor comprising in code instructions of a computer-program according to claim 13.

15. A wind turbine comprising a lidar sensor according to claim 14 within a wind turbine.

16. A wind turbine according to claim 15, wherein the lidar sensor is placed on a nacelle of the wind turbine.

\* \* \* \* \*